3,197,446
ROOM TEMPERATURE CURE OF HALO-
GENATED BUTYL RUBBER
George J. Ziarnik, Elizabeth, and Kenneth W. Powers,
Nixon, N.J., assignors to Esso Research and Engineering Company, a corporation of Delaware
No Drawing. Filed Nov. 8, 1960, Ser. No. 67,923
10 Claims. (Cl. 260—79.5)

The present invention deals with improving the vulcanizates obtained from halogenated copolymers of a major portion of an isoolefin and a minor portion of a multiolefin. More particularly, it deals with self-curing a halogenated butyl rubber recipe by the combination of zinc oxide, a heavy metal halide, and certain chemical activators.

Copolymers of the above general class, particularly where the copolymers contain about 85 to 99.5 wt. percent of a $C_4$ to $C_8$ isoolefin, e.g., isobutylene, with about 15 to 0.5 wt. percent of a multiolefin of about 4 to 14 carbon atoms, e.g., myrcene, isoprene, butadiene, 3-methyl butene-1, etc., are well known in the literature as "butyl rubber." For example, see "Synthetic Rubber" by G. S. Whitby, and U.S. Patent No. 2,356,128 among many others. Polymerization is generally carried out at low temperatures, i.e., −50 to −165° C., in the presence of a Friedel Crafts catalyst such as aluminum chloride dissolved in a lower alkyl halide. Butyl rubber has a viscosity average molecular weight of 200,000 to 1,500,000 and mole percent unsaturation of about 0.1 to 30. Halogenated butyl rubber-type copolymers are produced by halogenating butyl rubber in a manner which does not substantially degrade its molecular weight but does, however, give a rubbery product of substantially different properties than the unhalogenated material. Butyl rubber may be halogenated at temperatures of −50 to 200° C., preferably 0 to 100° C., at pressures of 0.5 to 900 p.s.i.g. with suitable halogenating agents such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a nonsolvent at about 0 to 180° C., spray drying, or by flashing off the hydrocarbon solvent by injection into a hot water bath.

Preferably, the degree of halogenation is carefully regulated so that the halogenated copolymer contains at least 0.5 wt. percent of combined halogen, but not more than about one atom of combined fluorine or chlorine per double bond in the polymer, nor more than three atoms of combined bromine or iodine per double bond. The brominated and chlorinated copolymers are preferred. A more detailed description of the formation of chlorinated butyl rubber may be had by referring to coassigned U.S. Patent No. 2,944,578, filed May 31, 1955.

The halogenated copolymer has a viscosity average molecular weight of about 100,000 to 2,000,000 and a mole percent unsaturation of between 0.1 to 20, preferably less than 10. As hereinafter employed in the specification, the term "halogenated butyl rubber" denotes the above-described halogenated copolymers of a major portion of a $C_4$ to $C_8$ isoolefin and a minor portion of a $C_4$ to $C_{14}$ multiolefin.

While halogenated butyl rubber has been vulcanized at conventional temperatures and utilized in the formation of tires, hosing, etc., heretofore halogenated butyl rubber has not been suitable for applications requiring low or room temperature cures. There exists a demand for self-curing cements, caulks, and proofed goods, all of which require a rubbery polymer to be capable of being cured at temperatures substantially below the conventional curing temperatures of about 250 to 400° F. Due to its low unsaturation level, halogenated butyl rubber offers a particularly difficult problem as to low temperature cures.

In accordance with the present invention, means have been found whereby halogenated butyl rubber can be cured at temperatures below 250° F., particularly at a temperature level of between 50 and 150° F. and especially at ambient temperatures. More particularly, it has been found that halogenated butyl rubber can be cured at low temperatures by employing a combination of zinc oxide, a heavy metal halide, and a member of the group consisting of trithiocarbonates, xanthates, and polyhydroxy aromatics, e.g., aromatic hydrocarbons containing at least two hydroxyl groups attached to the nucleus. Recipes containing the above combination of materials may be vulcanized at low temperatures for 5 minutes to 7 days or more. Typically, the compositions of the present invention may be applied upon an article and allowed thereafter to cure under ambient temperature conditions.

The heavy metal halide employed in the present invention is a halide of a metal chosen from the group consisting of II–B (zinc), IV–B (tin and germanium), V–B (antimony and arsenic), and VIII (iron, cobalt and nickel) metals, according to Hubbard's Periodic Chart of the Atoms published by the W. M. Welch Manufacturing Co., Chicago, Ill. Among the various metal halides suitable for the practice of the present invention are the following: zinc chloride, zinc bromide, zinc iodide, iron bromide, antimony chloride, antimony bromide, stannous chloride, stannous fluoride, stannous bromide, germanium chloride, arsenous chloride, arsenous bromide, cobalt bromide, nickel chloride, nickel fluoride, etc.

Trithiocarbonates, xanthates, and polyhydroxy aromatics which are suitable for the practice of the present invention may be represented by the following generic formula:

Trithiocarbonates

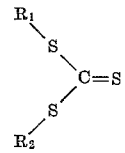

wherein $R_1$ and $R_2$ are selected from the group consisting of hydrogen, and $C_1$ to $C_8$ alkyl, aryl and aryl-alkyl, and alkali or heavy metal groups.

Xanthates

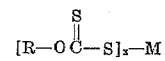

wherein R is an alkyl group containing 1 to 8 carbon atoms, M is a Group I or Group II metal such as sodium, zinc, etc.; and x is an integer from 1 to 2 (depending on the valence of the metal).

Polyhydroxy aromatics $$OH-Ar-OH$$

where Ar is an aromatic group, such as benzene, naphthalene, etc., which may be unsubstituted or have substituent groups, such as alkyls, hydroxy, etc. Particularly preferred are polyhydroxy benzene compounds.

Examples of suitable trithiocarbonates falling within the above structural formula are the following: ethylene trithiocarbonate, diethyl trithiocarbonate, dimethyl trithiocarbonate, methyl ethyl trithiocarbonate, dibenzyl trithiocarbonate, diphenyl trithiocarbonate, trimethylene trithiocarbonate, lead trithiocarbonate, sodium trithiocarbonate, ammonium trithiocarbonate.

Examples of xanthates falling within the above structural formula are the following: zinc dibutyl xanthate, zinc diisopropyl xanthate, zinc diethyl xanthate, zinc dibenzyl xanthate, zinc diphenyl xanthate, sodium butyl xanthate, lead butyl xanthate, copper butyl xanthate, potassium ethyl xanthate.

Examples of polyhydroxy aromatics falling within the above structural formula are the following: catechol, resorcinol, hydroquinone, pyrogallol, phloroglucinol, di-o-tolyl guanidine salt of dicatechol borate (Permalux), orcinol, t-butyl catechol, tetrahydroxybenzene, 1,5-dihydroxynaphthalene.

The composition of the halogenated butyl rubber recipes falling within the scope of the present invention is indicated in Table I. The proportion of ingredients is set forth as parts by weight per 100 parts by weight of rubbery halogenated copolymer.

*Table I*

|  | Parts per hundred of rubber | |
|---|---|---|
|  | Broad Range | Preferred Range |
| Zinc Oxide | 0.5 to 15 | 1 to 5 |
| Heavy Metal Halide | 0.05 to 10 | 0.1 to 5 |
| Activator (trithiocarbonates, xanthates, or polyhydroxy aromatics) | 0.05 to 10 | 0.1 to 5 |

Vulcanization recipes prepared in accordance with the present invention may also contain various additional materials such as carbon black, pigments, extender oils, etc. When utilizing the present compositions as cement compositions, they normally will also contain substituted and unsubstituted $C_6$ to $C_{13}$ aliphatic and aromatic hydrocarbon solvents such as hexane, decane, benzene, carbon tetrachloride, carbon disulfide, nitrobenzene, cyclohexane, xylene, chlorobenzene, ethylene dichloride, etc.

It is to be noted that the combination of all three of the component parts of the present vulcanization system is necessary to successfully effect curing at low temperatures, e.g., 50 to 150° F. Omission of any one of the members of the present combination fails to give vulcanizates of sufficient physical strength, i.e., tensile strength of at least 500 p.s.i. when cured 6 days at room temperature, to be useful for proofing or self-curing cements. Further, it is to be noted that the use of various conventional rubber accelerators such as 2-mercaptothiazoline, tetramethylthiuram disulfide, etc., in combination with zinc oxide and a heavy metal halide fail to give sufficient curing at low temperatures. The relative difficulty in vulcanizing a low unsaturation rubbery polymer such as halogenated butyl rubber further emphasizes the uniqueness of the low temperature cure offered by the present invention.

The various aspects and modifications of the present invention will be made more clearly apparent by reference to the following description and accompanying examples.

In the following examples, a typical halogenated butyl rubber copolymer, hereinafter denoted "chlorinated butyl rubber A," was employed. Chlorinated butyl rubber A contained 97 wt. percent isobutylene, 1.8 wt. percent isoprene, 1.2 wt. percent chlorine, and had a mole percent unsaturation of 0.8, and a viscosity average molecular weight of 350,000.

EXAMPLE 1

A base recipe of chlorinated butyl rubber A containing carbon black and stearic acid was compounded with zinc oxide and ethylene trithiocarbonate in the manner shown in Table II. Sample A illustrates the practice of the present invention whereas samples B and C indicate the results obtained by omission of elements of the present combination of vulcanizing agents. All samples were cured at room temperature for the periods indicated and the physical properties of the resulting vulcanizates determined in the conventional manner.

As shown by the above results, the combination of zinc oxide, a heavy metal halide, e.g., zinc chloride, and a trithiocarbonate, e.g., ethylene trithiocarbonate, results in a halogenated butyl rubber composition which is self-curing at room temperatures. The omission of a heavy metal halide or trithiocarbonate resulted in vulcanizates with considerably inferior properties.

EXAMPLE 2

In a manner similar to that described in Example 1, chlorinated butyl rubber A, compounded with carbon black and stearic acid, was further compounded with various combinations of zinc oxide, a heavy metal halide, and a polyhydroxy aromatic, as shown in Table III. The resulting recipes were then cured at room temperature, i.e., 75° F., simply by allowing them to stand undisturbed. The properties of the resulting vulcanizates are set forth in Table III.

*Table II*

Base Recipe:
Chlorinated Butyl Rubber A ___ 100
HAF Carbon Black ___ 50
Stearic Acid ___ 1

| Sample | A | | | B | | | C | | |
|---|---|---|---|---|---|---|---|---|---|
| Ethylene Trithiocarbonate, phr | 1 | | | 1 | | | | | |
| ZnO, phr | 5 | | | 5 | | | 5 | | |
| ZnCl₂, phr | 1 | | | | | | 1 | | |
| Cured at Room Temperature (75° F.): | 3.5 hr. | 26 hr. | 5 days | 1.5 hr. | 24 hr. | 5 days | 5 hr. | 29 hr. | 7 days |
| Tensile Strength, p.s.i. | 700 | 960 | 1,235 | 80 | 90 | 295 | 60 | 150 | 460 |
| Elongation, Percent | 480 | 450 | 400 | 1,100+ | 1,100+ | 700 | 1,100+ | 1,100+ | 800 |
| 300% Modulus, p.s.i. | 410 | 645 | 910 | | | 265 | | | 300 |

Table III

Basic Recipe:

| | phr. |
|---|---|
| Chlorinated Butyl Rubber A | 100 |
| HAF Carbon Black | 50 |
| Stearic Acid | 1 |

| Sample | D | | | E | | F | | G | | |
|---|---|---|---|---|---|---|---|---|---|---|
| Catechol, phr | 1 | | | 1 | | 1 | | | | |
| ZnO, phr | 5 | | | | | 5 | | 5 | | |
| ZnCl₂, phr | 1 | | | 1 | | | | 1 | | |
| Cured at Room Temperature (75° F.): | 3 hr. | 25 hr. | 5 days | 5 hr. | 5 days | 5 hr. | 5 days | 5 hr. | 29 hr. | 7 days |
| Tensile Strength, p.s.i | 250 | 550 | 865 | 85 | 325 | 70 | 105 | 60 | 150 | 460 |
| Elongation, percent | 1,100+ | 750 | 520 | 1,100+ | 800 | 1,100+ | 1,100+ | 1,100+ | 1,100+ | 800 |
| 300% Modulus, p.s.i | 130 | 300 | 600 | | 260 | | | | | 300 |

Table III illustrates that the combination of a polyhydroxy aromatic, i.e., catechol, together with zinc oxide and the heavy metal halide serves to cure halogenated butyl rubber at low temperatures. On the other hand, recipes omitting any one of these three materials fails to give commercially practicable low temperature cures.

EXAMPLE 3

To illustrate the specific nature of the present invention, a chlorinated butyl rubber masterbatch, having the composition indicated in Table IV, was compounded with various rubber accelerators. The resulting recipes were thereafter allowed to stand at room temperature, i.e., 75° F., for the periods of time indicated below, and the physical properties of the resulting cured rubbers determined.

Table IV

Masterbatch:

| | phr. |
|---|---|
| Chlorinated Butyl Rubber A | 100 |
| HAF Carbon Black | 50 |
| Stearic Acid | 1 |
| ZnO | 5 |
| ZnCl₂ | 1 |

| Recipes | 1 | 2 | 3 | 4 | 5 | 6 | 7 | 8 | 9 |
|---|---|---|---|---|---|---|---|---|---|
| Thiocarbanilide | 1.5 | | | | | | | | |
| Thioacetanilide | | 1 | | | | | | | |
| Thiobenzanilide | | | 1.5 | | | | | | |
| 2-mercaptothiazoline | | | | 1 | | | | | |
| Glycol Dimercaptoacetate | | | | | 1.5 | | | | |
| Tetramethylthiuram Disulfide | | | | | | 1 | | | |
| Bromo-Methylol-Phenol Resin [1] | | | | | | | 5 | | |
| Zinc Butyl Xanthate | | | | | | | | 1 | |
| Cured at Room Temperature (75° F.): | | | | | | | | | |
| Hours | 6 | 6 | 5 | 3 | 3 | 1.5 | 1 | 5 | 5 |
| Tensile Strength, p.s.i | 70 | 60 | 70 | 80 | 70 | 75 | 55 | 75 | 60 |
| Elongation, percent | 1,100+ | 1,100+ | 1,100+ | 1,100+ | 1,100+ | 1,100+ | 1,100+ | 1,100+ | 1,100+ |
| Cured at Room Temperature (75° F.): | | | | | | | | | |
| Days | 6 | 6 | 6 | 5 | 6 | 6 | 6 | 7 | 7 |
| Tensile Strength, p.s.i | 310 | 260 | 250 | 485 | 250 | 370 | 90 | 810 | 460 |
| Elongation, percent | 1,100 | 970 | 1,100 | 1,080 | 950 | 870 | 1,100+ | 500 | 800 |
| 300% Modulus, p.s.i | 190 | 220 | 180 | 220 | 210 | 270 | | 670 | 300 |

[1] Believed to be the brominated form of the condensation product of p-octylphenol and formaldehyde.

As shown in Table IV, the use of zinc oxide and zinc chloride in combination with various conventional accelerators, i.e., thiocarbanilide, thioacetanilide, thiobenzanilide, 2-mercaptothiazoline, glycol dimercaptoacetate, tetramethylthiuram disulfide, bromo-methylol-phenol resin, etc., fail to cure halogenated butyl rubber at room temperatures so as to give commercially acceptable vulcanizates. However, the combination of zinc oxide, zinc chloride, and an xanthate, i.e., Recipe 8, did give satisfactory self-curing at room temperatures.

EXAMPLES 4 TO 8

To illustrate the use of various metal halides for effecting low temperature curing in accordance with the present invention, chlorinated butyl rubber A was compounded in the manner set forth in Table V. After allowing each of the recipes to stand at room temperature, i.e., 75° F., for the periods of time indicated, the physical properties of the resulting vulcanizates were determined.

As shown below, various heavy metal halides of Groups II–B, V, and VIII can be employed to effect curing at room temperatures. The particularly outstanding results obtained by the use of zinc chloride are noted.

Further, Table V illustrates the use of various polyhydroxy aromatics, particularly polyhydroxy benzene compounds, e.g., catechol and resorcinol.

Various modifications may be made to the present invention. For example, halogenated butyl rubber may be compounded with the various components of the present cure systems at different times in order to insure that vulcanization will occur under controlled conditions. Such compositions are particularly attractive in applications such as cements, caulking compounds, sealants and proofed goods where room temperature or low temperature cures are required. Heretofore, it has been necessary to employ the more highly unsaturated elastomers for such uses. Now the availability of halogenated butyl-type polymer for these applications makes it possible to provide those properties which have traditionally been associated with butyl, such as low permeability, good weathering and good heat aging performance.

Having described the present invention, that which is sought to be protected is set forth in the following claims.

Table V

| Masterbatch: | phr. |
|---|---|
| Chlorinated Butyl Rubber A | 100 |
| HAF Carbon Black | 50 |
| Stearic Acid | 1 |

| Recipe | 4 | 5 | 6 | 7 | 8 |
|---|---|---|---|---|---|
| Ethylene Trithiocarbonate | 1 | 1 | | | |
| Catechol | | | 1 | 1 | |
| Resorcinol | | | | | 1 |
| Zinc Oxide | 5 | 5 | 5 | 5 | 5 |
| Zinc Chloride | 1 | | | | 1 |
| Antimony Chloride | | | | 1 | |
| Ferric Chloride | | 1 | | | |
| Zinc Bromide | | | 1 | | |

| Cure at Room Temperature (75° F.): | Hours | | | | |
|---|---|---|---|---|---|
| | 26 | 24 | 24 | 24 | 48 |
| Tensile Strength, p.s.i. | 760 | 410 | 690 | 330 | 200 |
| Elongation | 620 | 650 | 700 | 1,100+ | 1,100+ |

| | Days | | | | |
|---|---|---|---|---|---|
| | 6 | 5 | 6 | 6 | 6 |
| Tensile Strength, p.s.i. | 1,100 | 825 | 880 | 630 | 500 |
| Elongation | 340 | 500 | 410 | 650 | 780 |

What is claimed is:

1. A process for curing a halogenated rubbery copolymer which comprises curing at a temperature of less than 250° F. an admixture of (A) a halogenated copolymer of a major proportion of a $C_4$ to $C_8$ isoolefin and a minor proportion of a $C_4$ to $C_{14}$ multiolefin, containing at least 0.5 wt. percent of confined halogen, (B) about 0.5 to about 15 wt. percent, based on copolymer, of zinc oxide, (C) about 0.05 to about 10 wt. percent, based on copolymer, of a halide of a heavy metal selected from the group consisting of Group II-B, IV-B, V-B, and VIII metals, and (D) about 0.1 to about 5 wt. percent, based on copolymer, of a compound selected from the group consisting of ethylene trithiocarbonate, trimethylene trithiocarbonate, trithiocarbonates represented by the structural formula:

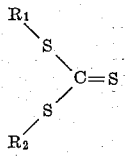

wherein $R_1$ and $R_2$ are each selected from the group consisting of hydrogen, $C_1$ to $C_8$ alkyl, aryl, aryl-alkyl, alkali metals, lead, ammonium; xanthates represented by the structural formula:

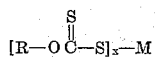

wherein R is selected from the group consisting of $C_1$ to $C_8$ alkyl, benzyl and phenyl, M is a metal selected from the group consisting of metals of Group I and Group II, $x$ is an integer or from 1 to 2; and an aromatic hydrocarbon containing at least two hydroxyl groups attached to the nucleus.

2. The process according to claim 1, wherein the halogenated rubbery copolymer is a copolymer of about 85 to about 99.5 wt. percent of a $C_4$ to $C_8$ isoolefin and about 15 to about 0.5 wt. percent of a $C_4$ to $C_{14}$ multiolefin.

3. The process according to claim 1, wherein the isoolefin is isobutylene and the multiolefin is isoprene.

4. The process according to claim 1, wherein the halogenated copolymer contains at least 0.5 wt. percent of combined halogen and wherein the amount of halogen and the halogen are correlated and selected from the group consisting of not more than about one atom of combined fluorine and chlorine per double bond in the copolymer and not more than about three atoms of combined bromine and iodine per double bond in the copolymer.

5. The process according to claim 1, wherein the curing temperature is from about 50° F. to about 150° F.

6. The process according to claim 1, wherein the heavy metal halide is zinc chloride.

7. The process according to claim 1, wherein the aromatic hydrocarbon containing at least two hydroxyl groups attached to the nucleus is catechol.

8. The process according to claim 1, wherein the xanthate is zinc butyl xanthate.

9. A process for curing a halogenated rubbery copolymer which comprises curing at a temperature of less than 250° F. an admixture of (A) a halogenated copolymer of about 85 to about 99.5 wt. percent of a $C_4$ to $C_8$ isoolefin and about 15 to about 0.5 wt. percent of a $C_4$ to $C_{14}$ multiolefin, containing at least 0.5 wt. precent of combined halogen, (B) about 0.5 to about 15 wt. percent, based on copolymer, of zinc oxide, (C) about 0.05 to about 10 wt. percent, based on copolymer, of zinc chloride, and (D) about 0.1 to about 5 wt. percent, based on copolymer, of ethylene trithiocarbonate.

10. A process for curing a halogenated rubbery copolymer which comprises curing at a temperature of less than 250° F. an admixture of (A) a halogenated copolymer of about 85 to about 99.5 wt. percent of a $C_4$ to $C_8$ isoolefin and about 15 to about 0.5 wt. percent of a $C_4$ to $C_{14}$ multiolefin, containing at least 0.5 wt. percent of combined halogen, (B) about 0.5 to about 15 wt. percent, based on copolymer, of zinc oxide, (C) about 0.05 to about 10 wt. percent, based on copolymer, of zinc chloride, and (D) about 0.1 to about 5 wt. percent, based on copolymer, of catechol.

References Cited by the Examiner

UNITED STATES PATENTS

| 2,963,462 | 12/60 | Braidwood | 260—41.5 |
| 2,965,600 | 12/60 | Minckler et al. | 260—41.5 |
| 2,965,621 | 12/60 | Serniuk et al. | 260—96 |
| 2,996,473 | 8/61 | Cain et al. | 260—79 |
| 3,011,996 | 12/61 | Kuntz et al. | 260—41.5 |
| 3,051,680 | 8/62 | Minckler et al. | 260—41.5 |
| 3,076,778 | 2/63 | Minckler et al. | 260—79 |

OTHER REFERENCES

W. McG. Morgan: Trans. Inst. Rubber Ind., vol. 25, pages 13–42 (1949), as reported in Chem. Abs., vol. 43, 1949, pages 7743–44.

Wilson, B. J.: British Compounding Ingredients for Rubber (1958), p. 19.

LEON J. BERCOVITZ, *Primary Examiner.*

MILTON STERMAN, JOSEPH R. LIBERMAN, WILLIAM H. SHORT, *Examiners.*